E. FISK.
Broadcast-Seeder.
No. 3,828.
Patented Nov. 18, 1844.
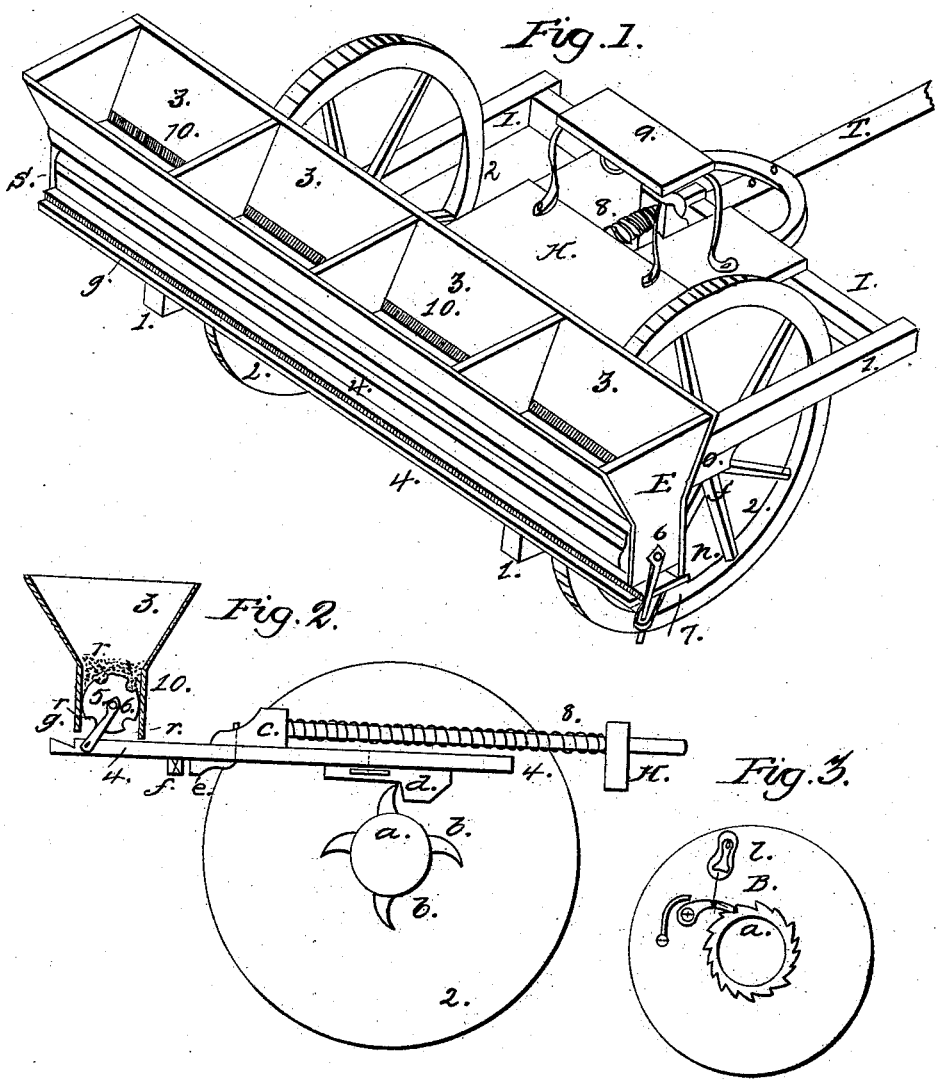

UNITED STATES PATENT OFFICE.

EZRA FISK, OF FAYETTE, MAINE.

IMPROVEMENT IN SOWING-MACHINES.

Specification forming part of Letters Patent No. 3,828, dated November 18, 1844.

*To all whom it may concern:*

Be it known that I, EZRA FISK, of Fayette, in the county of Kennebec and State of Maine, have invented a new and useful Machine for Sowing Grain of Different Kinds Broadcast; and I do hereby declare that the following is a full and exact description of the same, reference being had to the annexed drawings, which are made part of the description.

The nature of my invention consists in the combined operation of a cylinder, a movable slide or platform, and a spiral spring, all which receive motion from and are operated by the wheels of the carriage of the machine by means of a series of cams.

Figure 1 of the accompanying drawings is a perspective view, representing the whole machine ready for operation. Fig. 2 is a longitudinal elevation of parts of the machine, representing the connectives of the platform and cylinder and the manner in which the cams operate upon the platform. Fig. 3 is a section of the machine in which is represented the medium through which the wheels operate upon the cams—viz., by ratchets and pawls.

1 1, as shown in the perspective view, is a square frame-work, the side timbers of which have their bearings on the projecting ends of the axle A, outside of the hubs of the wheels, as shown at $f$.

2 2 represent the wheels on which the machine travels and by which it is operated. Between the inward ends of the hubs and the shoulders of the axle are circular ratchets with pawls attached, as at B, Fig. 3, the ratchets being confined to the axle and the pawls to the hubs. The axle revolves with the wheels when the pawls are down on the ratchets.

3 is the hopper which contains the grain or seed, and it is divided into several apartments to prevent any lateral displacement of the seed. The side pieces of the hopper incline inward toward each other, so as to leave but a narrow opening at the bottom, below which the end pieces of the hopper extend and serve as bearings of the gudgeons of the cylinders, as shown at E, Fig. 1, and on the front of this extension of the end pieces is a piece of thin board which extends the whole length of the hopper and projects one inch below the said end pieces, as shown at $h$, to prevent the seed from escaping forward and to scrape it back as the slide moves forward.

5 is a cylinder or feeding-roller, in the periphery of which are grooves of different capacities, adapted to receive different quantities of seed, and consequently to sow different quantities per acre, as occasion may require. The cylinder comes nearly in contact with the rear side piece of the hopper to prevent seed from escaping on that side; but a space half an inch in depth is left between the cylinder and the front side piece of the hopper, and this space is occupied by the brush 10, which consists of a continuous row of some flexible substance—such as bristles, coarse hair, &c.—extending the whole length of $h$, (the front piece of the hopper,) and is firmly attached to the lower edge of the same to prevent the escape of any more seed than what is contained in the groove of the cylinder.

4 shows the slide or movable platform upon which the seed falls as it is thrown from the feeding-roller. (See 4, Fig. 2.)

$g$ is a channel at the rear termination of the slide, into which the seed is scraped and from whence it is thrown by a peculiar concussion that takes place in the operation, as hereinafter explained.

6 represents the rods attached to the axis of the cylinder 5 to connect it with the slide 4.

7 represents the sockets which are attached to the ends of the slide 4, and extend outward so as to receive the ends of the rods 6, which work in the sockets and complete the connection between the slide and cylinder.

8 is a spiral spring, which incloses a rod attached to the stem of the slide 4 by the projection $c$, Fig. 2.

9 is an elevated seat for the workman, resting on the platform H, Fig. 1.

10 represents the brush at the bottom of the hopper 3, as before specified and described.

11 represents a movable stud in which the rod $c$ works. By the movable quality of this stud the force of the spring 8 is regulated.

$f$ shows the bearing of the frame-work 1 on the projecting ends of the axle of the wheels 2 2.

Fig. 2: The figures in this correspond with those of Fig. 1—namely, 2, the wheels; 3, the hopper; 4, the side; 5, cylinder; 6, connecting-rods attached to the axis of cylinder 5; 7, sockets attached to the slide 4; 8, spiral spring; 10, brush at the bottom of the hopper 3.

A represents the axle of the wheels 2 2.

*b* represents cams attached to axle of the wheels at the center of its length to operate the slide 4.

C represents projection of the rod, which is inclosed in the spiral spring 8, and at this projection the rod is attached to the stem of slide 4.

*d* represents a movable puppet, against which the cams press and force the slide forward.

*e* represents a projection of the stem of slide 4, which strikes against a cross-timber, X, of the frame work 1 1, producing a concussion which throws the seed from the channel *g*, scattering it evenly on the ground.

T represents a pole or tongue for a pair of horses. A pair of thills must be substituted for the tongue when one horse only is used.

*l* represents a loop attached to the polls to keep them up when they are elevated.

Operation: To operate the machine above described I attach a pole or tongue to the front or forward timber of the frame-work 1 1 for a pair of horses, or a pair of thills for one horse, as occasion may require. The seed to be sown is placed upon the platform H in any convenient quantities, and the pawls being raised from the ratchets, the workman can mount his seat and drive to the field, and there, before commencing operations, the pawls must be let down upon the ratchets, and the position of the feeding-roller must be such as to bring the groove that is used directly forward or in front. More or less force of the spring is acquired at pleasure by moving the stud 11, Fig. 2, nearer to or farther from the spring. As the movable platform or apron is pressed forward by the cams the feeding-roller makes a partial turn backward, which brings the groove that is used directly under the hopper, where it is filled with seed, and when the slide is forced back by the spring the roller is suddenly returned to its first position, discharging its contents upon the apron beneath, and by the next forward movement of the slide the seed is scraped into the channel *g*, whence it is thrown by the succeeding concussion. When the sewing of one breadth is completed the machine is passed to another without sowing seed by backing round or by elevating one of the pawls and turning in the other direction.

Having thus described the construction and operation of my broadcast-sowing machine, I would here observe that I do not confine myself to any particular kind of materials to be used in the construction of the several parts, nor do I confine myself to any particular dimensions or proportions of the machine; but I purpose to use any and all suitable kinds of materials, and to build machines of such size and proportions as shall appear to be best adapted to their practical use and application, having regard to the extent of business where they are used.

What I claim is—

The combination of the vibrating grooved cylinder with the vibrating slide or platform, and also, in combination with the vibrating cylinder, the brush, as described, said parts being arranged and operated substantially in the manner set forth.

EZRA FISK.

Witnesses:
LANGDON GILMORE,
DUDLLEY B. FISK.